(12) United States Patent
Shin et al.

(10) Patent No.: US 11,682,104 B2
(45) Date of Patent: *Jun. 20, 2023

(54) DISPLAY APPARATUS CAPABLE OF LATERALLY SHIFTING IMAGE

(71) Applicants: SAMSUNG ELECTRONICS CO., LTD., Suwon-si (KR); MYONGJI UNIVERSITY INDUSTRY AND ACADEMIA COOPERATION, Yongin-si (KR)

(72) Inventors: Bongsu Shin, Seoul (KR); Woojun Han, Yongin-si (KR); Jaisoon Kim, Yongin-si (KR); Sunil Kim, Seoul (KR); Geeyoung Sung, Daegu (KR)

(73) Assignees: SAMSUNG ELECTRONICS CO., LTD., Suwon-si (KR); MYONGJI UNIVERSITY INDUSTRY AND ACADEMIA COOPERATION, Yonsin-si (KR)

( * ) Notice: Subject to any disclaimer, the term of this patent is extended or adjusted under 35 U.S.C. 154(b) by 168 days.

This patent is subject to a terminal disclaimer.

(21) Appl. No.: 17/200,399

(22) Filed: Mar. 12, 2021

(65) Prior Publication Data

US 2021/0201443 A1 Jul. 1, 2021

Related U.S. Application Data

(63) Continuation of application No. 16/539,618, filed on Aug. 13, 2019, now Pat. No. 10,977,770.

(30) Foreign Application Priority Data

Mar. 11, 2019 (KR) ........................ 10-2019-0027630

(51) Int. Cl.
*G06T 3/20* (2006.01)
*G02B 27/00* (2006.01)
(Continued)

(52) U.S. Cl.
CPC ............ *G06T 3/20* (2013.01); *G02B 27/0075* (2013.01); *G02B 27/0093* (2013.01); *G02F 1/29* (2013.01);
(Continued)

(58) Field of Classification Search
CPC ......... G06T 19/006; G06T 3/20; G06T 5/003; G06T 7/70; G02B 27/0075; G02B 27/0093; G02B 2027/0187; G02F 1/29
See application file for complete search history.

(56) References Cited

U.S. PATENT DOCUMENTS 5,392,149 A 2/1995 Boardman et al.
5,479,224 A 12/1995 Yasugaki et al.
(Continued)

FOREIGN PATENT DOCUMENTS

CN 207081891 U 3/2018
JP H06-250113 A 9/1994
(Continued)

OTHER PUBLICATIONS

Watanabe, machine translation of JP2009-192559 (Year: 2009).*
(Continued)

*Primary Examiner* — Sing-Wai Wu
(74) *Attorney, Agent, or Firm* — Sughrue Mion, PLLC

(57) ABSTRACT

Provided is a display apparatus including an image forming optical system configured to form an image to be displayed, an eyepiece optical system configured to provide the image formed by the image forming optical system to a pupil of an observer, and an image shifting optical system disposed on an optical path between the image forming optical system and the eyepiece optical system, the image shifting optical system being configured to shift the image formed by the image forming optical system in a direction perpendicular to an optical axis, wherein the image shifting optical system
(Continued)

includes a first optical member having a first focal length and a second optical member having a second focal length, and wherein a distance between the first optical member and the second optical member along the optical axis is equal to a sum of the first focal length and the second focal length.

19 Claims, 16 Drawing Sheets

(51) Int. Cl.
    *G02F 1/29*     (2006.01)
    *G06T 5/00*     (2006.01)
    *G06T 7/70*     (2017.01)
    *G06T 19/00*     (2011.01)
    *G02B 27/01*     (2006.01)
    *G06V 40/19*     (2022.01)

(52) U.S. Cl.
    CPC ............... *G06T 5/003* (2013.01); *G06T 7/70* (2017.01); *G06T 19/006* (2013.01); *G06V 40/19* (2022.01); *G02B 2027/0178* (2013.01); *G02B 2027/0187* (2013.01); *G02F 1/294* (2021.01)

(56) References Cited

U.S. PATENT DOCUMENTS

| | | | |
|---|---|---|---|
| 5,619,735 | A | 4/1997 | Kai |
| 5,678,071 | A | 10/1997 | Ohtake |
| 5,721,641 | A | 2/1998 | Aoki |
| 8,684,527 | B2 | 4/2014 | Warden et al. |
| 9,116,337 | B1 | 8/2015 | Miao |
| 2002/0163872 | A1 | 11/2002 | Roh |
| 2004/0150758 | A1 | 8/2004 | Tomono |
| 2008/0212195 | A1 | 9/2008 | Yamamoto |
| 2013/0016413 | A1 | 1/2013 | Saeedi et al. |
| 2013/0170031 | A1 | 7/2013 | Bohn et al. |
| 2013/0176533 | A1 | 7/2013 | Raffle et al. |
| 2015/0277123 | A1 | 10/2015 | Chaum et al. |
| 2015/0370075 | A1 | 12/2015 | Ato |
| 2016/0139395 | A1 | 5/2016 | Miyazono |
| 2016/0327793 | A1 | 11/2016 | Chen et al. |
| 2017/0086667 | A1 | 3/2017 | Zhou |

FOREIGN PATENT DOCUMENTS

| | | |
|---|---|---|
| JP | 2009-192559 A | 8/2009 |
| JP | 4832310 B2 | 12/2011 |
| JP | 2013-210587 A | 10/2013 |

OTHER PUBLICATIONS

Kai, machine translation of JP2013-210587 (Year: 2013).*
Communication dated Feb. 3, 2022, issued by the European Patent Office in European Application No. 19201064.3.
Communication dated Apr. 20, 2020, issued by the European Patent Office in European Application No. 19201064.3.
D. Armitage et al. "Near-to-Eye Systems" Introduction to Microdisplays, Jan. 1, 2006, (pp. 337-363) XP007904915.

* cited by examiner

DISPLAY APPARATUS CAPABLE OF LATERALLY SHIFTING IMAGE

CROSS-REFERENCE TO RELATED APPLICATION

This application is a continuation of U.S. application Ser. No. 16/539,618, filed Aug. 13, 2019, which claims priority from Korean Patent Application No. 10-2019-0027630, filed on Mar. 11, 2019 in the Korean Intellectual Property Office, the disclosure of which is incorporated herein in its entirety by reference.

BACKGROUND

1. Field

Example embodiments of the present disclosure relate to a display apparatus capable of laterally shifting an image, and more particularly, to a display apparatus that may shift an image according to a position of a pupil of an observer, thereby substantially expanding a viewing window.

2. Description of the Related Art

Along with the recent development of electronic devices and display apparatuses capable of implementing virtual reality (VR), interest in these devices is also increasing. Techniques capable of implementing augmented reality (AR) and mixed reality (MR) as the next stage of VR have been studied.

AR, unlike VR assuming a complete virtual world, is a display technology for showing a virtual object or information in an overlapping or combined manner in a real-world environment, further enhancing the effect of reality. While VR is only applicable to virtual experiences, such as in the field of game, AR is more widely applicable to various real environments. In particular, AR has attracted much attention as a next-generation display technology suitable for a ubiquitous environment or an Internet of things (IoT) environment. Such AR may be an example of MR in that it shows the real world and additional information of the virtual world in a mixed manner.

In a VR, AR, or MR display apparatus, various techniques for expanding a viewing window have been proposed. For example, foveated rendering may be implemented or image depth may be adjusted, according to a position of a pupil of an observer. Alternatively, a position of an image to be displayed may be controlled using a rotating mirror or a shifting mirror.

SUMMARY

One or more example embodiments provide a display apparatus capable of laterally shifting an image, and more particularly, to a display apparatus that may shift an image according to a position of a pupil of an observer, thereby substantially expanding a viewing window.

According to an aspect of an example embodiment, there is provided a display apparatus including an image forming optical system configured to form an image to be displayed, an eyepiece optical system configured to provide the image formed by the image forming optical system to a pupil of an observer, and an image shifting optical system disposed on an optical path between the image forming optical system and the eyepiece optical system, the image shifting optical system being configured to shift the image formed by the image forming optical system in a direction perpendicular to an optical axis, wherein the image shifting optical system includes a first optical member having a first focal length and a second optical member having a second focal length, and wherein a distance between the first optical member and the second optical member along the optical axis is equal to a sum of the first focal length and the second focal length.

The first optical member may be spaced apart by the first focal length along the optical axis toward an image side from a first pupil on which an image is focused between the image forming optical system and the first optical member.

The second optical member may be spaced apart by the second focal length along the optical axis toward an object side from a second pupil on which an image is focused between the image shifting optical system and the eyepiece optical system.

The display apparatus may further include an eye tracker configured to track a position of the pupil of the observer, and a controller configured to control a position of the image shifting optical system based on a change of the position of the pupil of the observer provided from the eye tracker.

The display apparatus may further include an actuator configured to move the image shifting optical system in the direction perpendicular to the optical axis based on a control of the controller.

A distance $\delta$ by which an image is shifted between the image shifting optical system and the eyepiece optical system in the direction perpendicular to the optical axis may satisfy $\delta = -\Delta(1/M_A - 1)$, $\Delta$ being a distance the image shifting optical system moves in the direction perpendicular to the optical axis and $M_A$ being a magnification of the image shifting optical system.

A movement distance $\delta_P$ of an exit pupil in the direction perpendicular to the optical axis may satisfy $\delta_P = M_P \times \delta$, $M_P$ being a magnification of the eyepiece optical system.

The first focal length of the first optical member and the second focal length of the second optical member may be equal to each other.

The image forming optical system may include an illuminating device configured to emit illumination light, a spatial optical modulator configured to form an image by reflecting and modulating the illumination light, and a beam splitter configured to transmit the illumination light to the spatial optical modulator and transmit the image formed by the spatial optical modulator to the image shifting optical system.

The image forming optical system may further include an objective lens configured to collimate the illumination light emitted from the illuminating device to the spatial optical modulator and focus the image formed by the spatial optical modulator on a first pupil between the image forming optical system and the image shifting optical system.

The image forming optical system may further include a spatial filter configured to remove light other than the image focused by the objective lens.

The image forming optical system may further include a folding mirror configured to bend a travel path of the image by reflecting the image focused by the objective lens.

The image forming optical system may include an illuminating device configured to emit illumination light, a collimating lens configured to collimate the illumination light into parallel light, a spatial optical modulator configured to form an image by transmitting and modulating the collimated illumination light, and an objective lens configured to focus the image formed by the spatial optical modulator on a first pupil that is located between the image forming optical system and the first optical member.

The eyepiece optical system may include at least two lens elements configured to focus, on an exit pupil of the eyepiece optical system, an image focused on a second pupil between the image shifting optical system and the eyepiece optical system.

The eyepiece optical system may include a first beam splitter configured to reflect light incident from a first surface of the first beam splitter and to transmit light incident from a second surface of the first beam splitter, a first mirror disposed on the second surface of the beam splitter and configured to reflect light, a second mirror configured to focus an image on the pupil of the observer, and a second beam splitter configured to reflect light incident from the first mirror to the second mirror and to transmit light incident from the second mirror.

The second mirror may include a concave first surface and a convex second surface disposed opposite the first surface, the second mirror being configured to reflect light incident on the first surface and to transmit light incident on the second surface.

The display apparatus may be a head-mounted type, glasses-type, or goggle-type virtual reality display apparatus, an augmented reality display apparatus, or a mixed reality display apparatus.

The eyepiece optical system may include a first beam splitter configured to reflect light incident from a first surface of the first beam splitter and to transmit light incident from a second surface of the first beam splitter, a first mirror disposed on the second surface of the beam splitter and configured to reflect light, a second mirror configured to focus an image on the pupil of the observer, and a second beam splitter configured to transmit light coming from the first mirror to the second mirror and to reflect light coming from the second mirror.

The first optical member and the second optical member respectively may include a convex lens.

The first optical member may include a convex lens, and the second optical member may include a concave lens.

The image shifting optical system may further include a beam splitter configured to transmit light incident from the first optical member and to reflect light incident from the second optical member.

The image shifting optical system may further include a beam splitter configured to reflect light incident from the first optical member and to transmit light incident from the second optical member.

The first optical member may include a concave lens, and the second optical member may include a convex lens.

The image shifting optical system may further include a beam splitter configured to reflect light incident from the image forming optical system and to transmit light incident from the first optical member toward the second optical member.

The first optical member and the second optical member may respectively include a concave lens, and the image shifting optical system may further include a first beam splitter configured to reflect light incident from the image forming optical system and to transmit light incident from the first optical member toward the second optical member, and a second beam splitter configured to transmit the light incident from the first optical member and to reflect the light incident from the second optical member.

According to an aspect of an example embodiment, there is provided a display apparatus including an image forming optical system configured to form an image and focus the image on a first pupil, an eyepiece optical system configured to provide the image focused on the first pupil to a pupil of an observer, an image shifting optical system disposed on an optical path between the first pupil and the eyepiece optical system, the image shifting optical system being configured to move by a movement distance in a direction perpendicular to an optical axis to shift the image focused on the first pupil in a direction perpendicular to an optical axis, and an eye tracker configured to track a change in a position of the pupil of the observer, wherein the image shifting optical system includes a first optical member having a first focal length and a second optical member having a second focal length, wherein a distance between the first optical member and the second optical member along the optical axis is equal to a sum of the first focal length and the second focal length, and wherein the movement distance corresponds to the change in the position of the pupil of the observer.

The display apparatus may further include a controller configured to move the image shifting optical system by the movement distance based on the change of the position of the pupil of the observer provided from the eye tracker.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
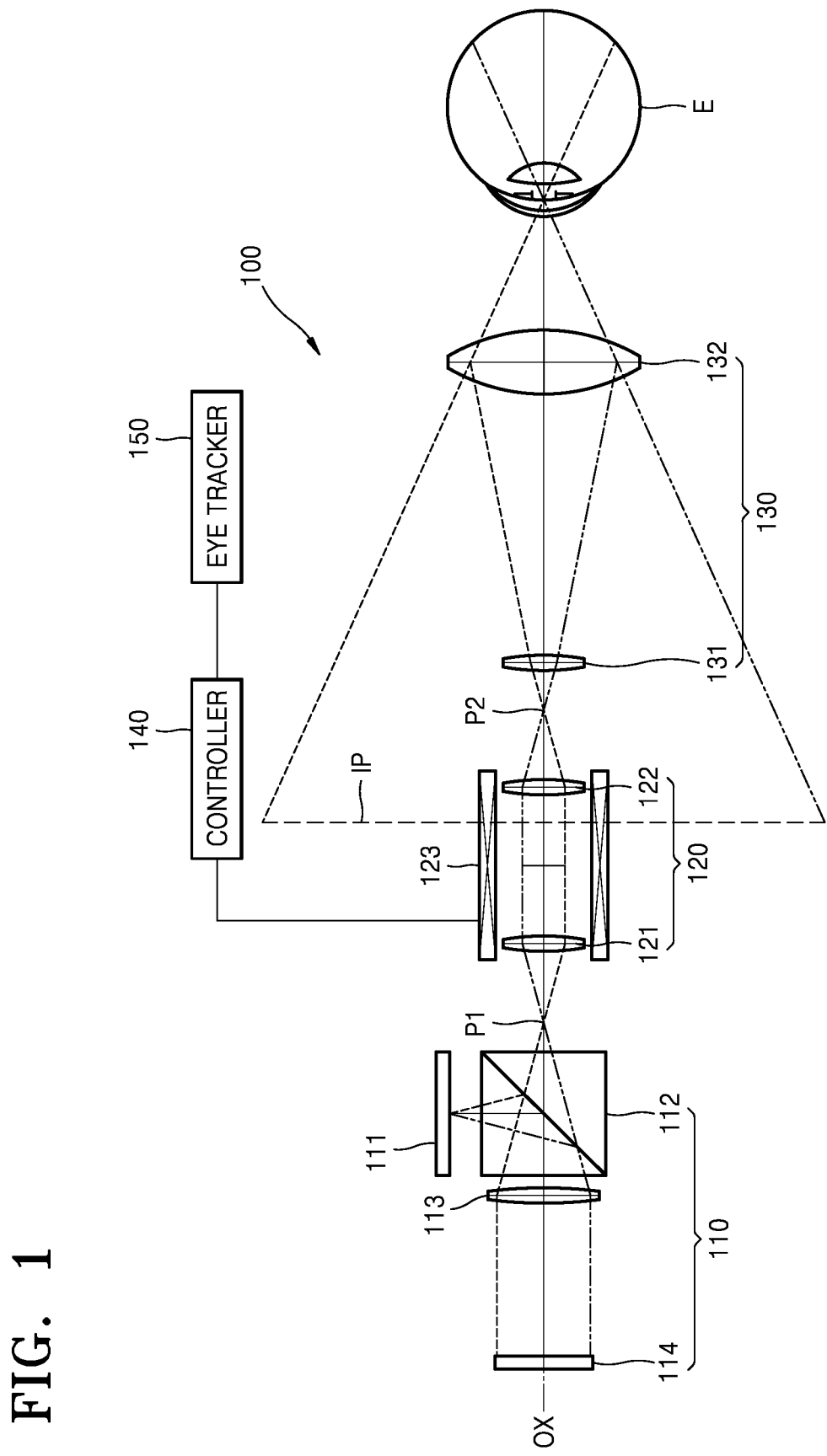
FIG. 1 illustrates a structure of a display apparatus according to an example embodiment.

Reference will now be made in detail to example embodiments of which are illustrated in the accompanying drawings, wherein like reference numerals refer to like elements throughout. In this regard, example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

An expression used in the singular encompasses the expression of the plural, unless it has a clearly different meaning in the context. In addition, unless explicitly described to the contrary, the word "comprise" and variations such as "comprises" or "comprising" will be understood to imply the inclusion of stated elements but not the exclusion of any other elements.

Hereinbelow, referring to the attached drawings, a display apparatus capable of laterally shifting an image will be described in detail. In the drawings, a size of each element may be exaggerated for clarity and convenience of a description. Meanwhile, the following example embodiments described below are merely illustrative, and various modifications may be possible from the example embodiments. In a layer structure described below, when a position of an element is described using an expression "above" or "on", the position of the element may include not only the element being "immediately on/under/left/right in a contact manner" but also being "on/under/left/right in a non-contact manner".

FIG. 1 schematically illustrates a structure of a display apparatus 100 according to an example embodiment. Referring to FIG. 1, the display apparatus 100 according to an example embodiment may include an image forming optical system 110 configured to form an image to be displayed, an image shifting optical system 120 configured to shift an image in a direction perpendicular to an optical axis OX, and an eyepiece optical system 130 configured to provide an image to a pupil of an observer. The display apparatus 100 may further include an eye tracker 150 configured to track a position of a pupil of an observer and a controller 140 configured to control a position of the image shifting optical system 120 in response to a change of the position of the pupil of the observer, provided from the eye tracker 150. The eye tracker 150 may obtain an image of the observer through a camera, etc., detect the pupil of the observer from the image, and analyze the position of the pupil of the observer. The eye tracker 150 may track the change of the position of the pupil of the observer and provide a result of the tracking to the controller 140.

The image forming optical system 110 may include an illuminating device 111 that provides illumination light, a spatial optical modulator 114 that forms an image by reflecting and modulating the illumination light, a beam splitter 112 configured to deliver the illumination light to the spatial optical modulator 114 and to deliver the image formed by the spatial optical modulator 114 to the image shifting optical system 120, and an objective lens 113 disposed between the spatial optical modulator 114 and the beam splitter 112. Although the objective lens 113 is illustrated as one lens element in FIG. 1, the objective lens 113 may include a plurality of lens elements configured to correct aberration and distortion of the image.

The illuminating device 111 may include, for example, an array of a plurality of light-emitting diodes (LEDs) that emit red light, green light, and blue light, but example embodiments are not limited thereto. The illumination light emitted from the illuminating device 111, after being reflected by the beam splitter 112, may become parallel light by passing through the objective lens 113, and may be incident on the spatial optical modulator 114. Thus, the objective lens 113 may serve as a collimating lens that collimates the illumination light delivered from the illuminating device 111 to the spatial optical modulator 114.

The spatial optical modulator 114 may form an image by modulating the incident light based on an image signal provided from a signal processor. The spatial optical modulator 114 may include, for example, a liquid crystal on silicon (LCoS) panel, a digital light projection (DLP) panel, or a digital micromirror device (DMD) panel. The spatial optical modulator 114 may form the image by changing a reflectivity according to a position of the incident light on a surface of the spatial optical modulator 114.

The image formed by reflection of the illumination light through the spatial optical modulator 114 may pass through the objective lens 113. The objective lens 113 may focus the image formed by the spatial optical modulator 114 to a first pupil P1 between the image forming optical system 110 and the image shifting optical system 120.

The image shifting optical system 120 may be disposed on a light path between the image forming optical system 110 and the eyepiece optical system 130, and relay the image to the eyepiece optical system 130 and at the same time, shift the image in a direction perpendicular to the optical axis OX. In particular, the image shifting optical system 120 may shift the image under control of the controller 140 to more accurately provide the image to the pupil of the observer in response to the change of the position of the pupil of the observer provided from the eye tracker 150. To this end, the image shifting optical system 120 may include a first optical member 121, a second optical member 122, and an actuator 123 that moves the image shifting optical system 120 in the direction perpendicular to the optical axis OX under control of the controller 140. The actuator 123 may be configured to move the first optical member 121 and the second optical member 122 perpendicularly to the optical axis OX at the same time.

Figure 2:
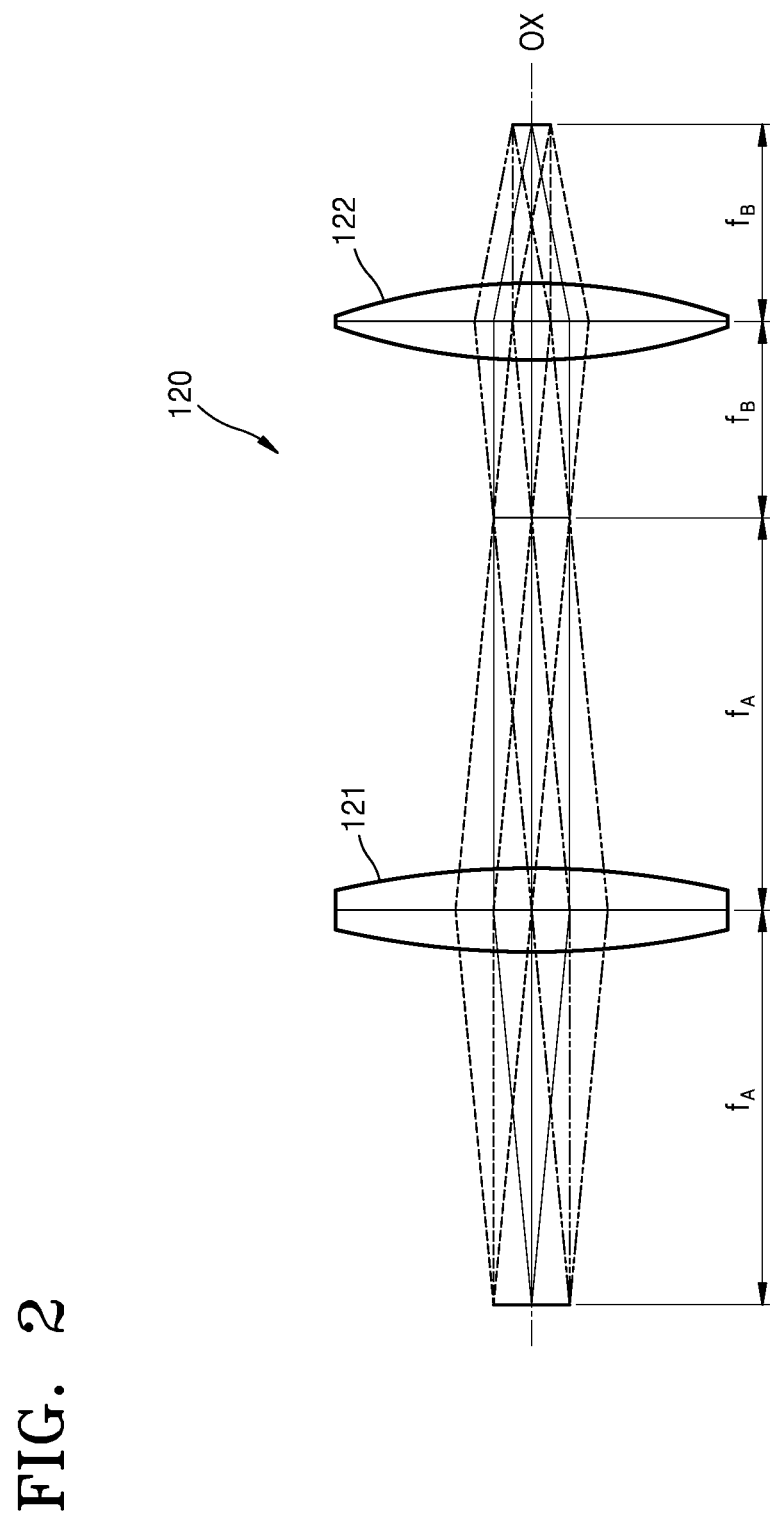
FIG. 2 illustrates an optical structure of an image shifting optical system of the display apparatus illustrated in FIG. 1.

FIG. 2 illustrates in detail an optical structure of the image shifting optical system 120 of the display apparatus 100 illustrated in FIG. 1. Referring to FIG. 2, the image shifting optical system 120 may include the first optical member 121 and the second optical member 122 that are sequentially disposed along the optical axis OX. The first optical member 121 may be a convex lens having a first focal length $f_A$, and the second optical member 122 may be a convex lens having a second focal length $f_B$. While each of the first optical member 121 and the second optical member 122 is illustrated in FIG. 1 as a single lens, each of the first optical member 121 and the second optical member 122 may include a plurality of lens elements, respectively. For example, each of the first optical member 121 and the second optical member 122 may include at least one lens group having a positive refractive power, each of which includes at least two lens elements.

The first optical member 121 and the second optical member 122 may relay the image focused on the first pupil P1 between the image forming optical system 110 and the image shifting optical system 120 and focus the image to a second pupil P2 between the image shifting optical system 120 and the eyepiece optical system 130. To this end, the first optical member 121 and the second optical member 122 may be spaced apart from each other by a sum of the first focal length $f_A$ and the second focal length $f_B$. That is, a distance between the first optical member 121 and the second optical member 122 on the optical axis OX is equal to the sum $f_A+f_B$ of the first focal length $f_A$ and the second focal length $f_B$. Herein, the distance between the first optical member 121 and the second optical member 122 may be measured with respect to a central point of the first optical member 121 and a central point of the second optical member 122 on the optical axis OX.

The first optical member 121 may be disposed to be spaced apart by the first focal length $f_A$ along the optical axis OX toward an image side, from a plane perpendicular to the optical axis OX on which the first pupil P1 to which the image is focused is located between the image forming optical system 110 and the first optical member 121. The second optical member 122 may be disposed to be spaced apart by the second focal length $f_B$ along the optical axis OX, toward an object side from a plane perpendicular to the optical axis OX on which the second pupil P2 to which the image is focused is located between the second optical member 122 and the eyepiece optical system 130. Then, the image shifting optical system 120 may satisfy an afocal condition and a telecentric condition, thus delivering the image on the first pupil P1 to the second pupil P2. The image shifting optical system 120 may shift the image of the first pupil P1 on the optical axis OX, in the direction perpendicular to the optical axis OX along the plane perpendicular to the optical axis OX on which the second pupil P2 is located.

Figure 3:
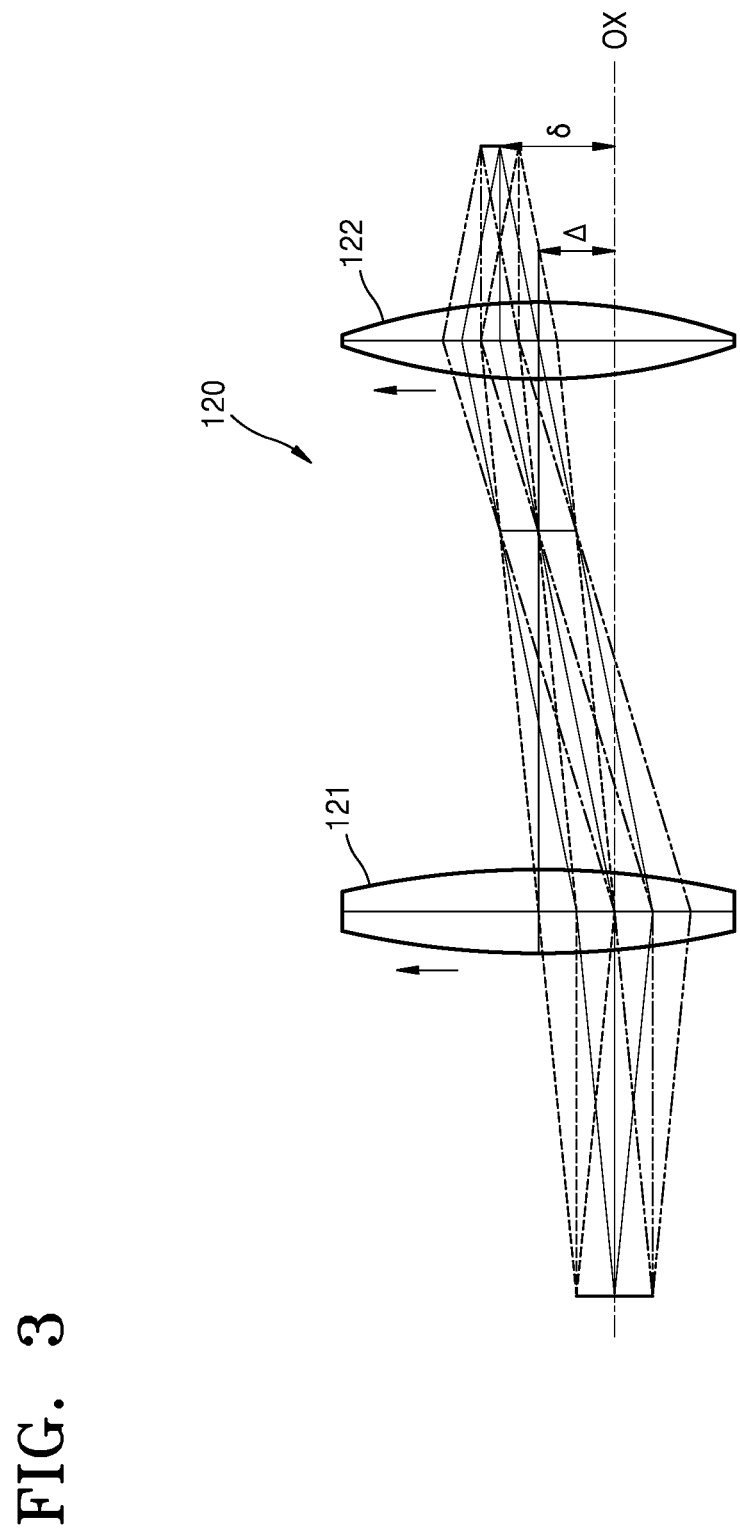
FIGS. 3 and 4 illustrate operations of the image shifting optical system illustrated in FIG. 2.
Figure 4:
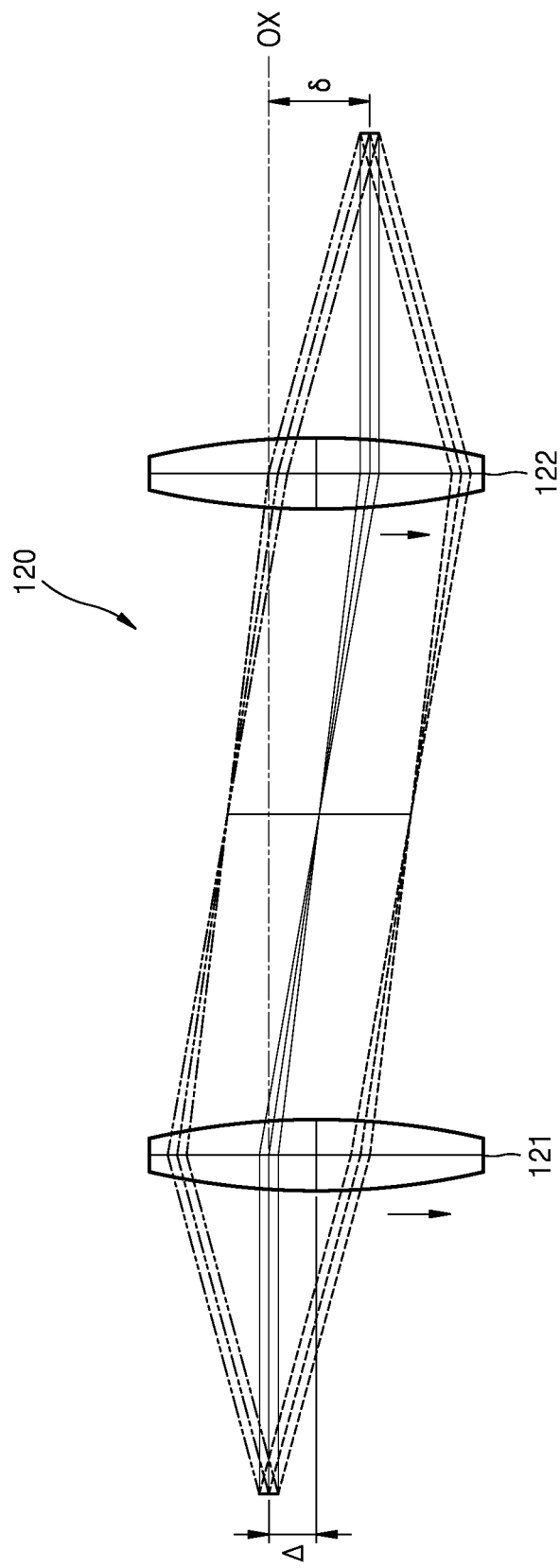

For example, FIGS. 3 and 4 illustrate operations of the image shifting optical system illustrated in FIG. 2. Referring to FIG. 3, when the first optical member 121 and the second optical member 122 of the image shifting optical system 120 move up by a distance Δ in the direction perpendicular to the optical axis OX, the image is shifted up by a distance δ in the direction perpendicular to the optical axis OX on the plane where the second pupil P2 is located. Herein, the distance δ by which the image is shifted may be expressed by Equation 1.

$$\delta = -\Delta\left(\frac{1}{M_A} - 1\right) \qquad \text{[Equation 1]}$$

In Equation 1, $M_A$ indicates a magnification of the image shifting optical system 120. The magnification $M_A$ of the image shifting optical system 120 may be expressed by Equation 2.

$$M_A = -\frac{f_A}{f_b} \qquad \text{[Equation 2]}$$

Referring to FIG. 4, when the first optical member 121 and the second optical member 122 of the image shifting optical system 120 move down by the distance Δ in the direction perpendicular to the optical axis OX, the image is shifted down by the distance δ in the direction perpendicular to the optical axis OX on the plane where the second pupil P2 is located.

Referring back to FIG. 1, the eyepiece optical system 130 is configured to deliver the image on the second pupil P2 to a pupil of an eye E of the observer. For example, the eyepiece optical system 130 may include at least two lens elements 131 and 132 configured to focus the image focused on the second pupil P2 to the exit pupil. While the eyepiece optical system 130 is illustrated in FIG. 1 as including the two lens elements 131 and 132, the eyepiece optical system 130 may include more lens elements to compensate aberration and distortion of the image. The image on the second pupil P2 is enlarged or reduced with a magnification $M_P$ by the eyepiece optical system 130. Finally, when the image is provided to the pupil of the eye E of the observer by the eyepiece optical system 130, the observer may see an enlarged or reduced imaginary image located on an image plane IP.

In the direction perpendicular to the optical axis OX, the position of the exit pupil of the eyepiece optical system 130 is opposite to the position of the second pupil P2. For example, when the second pupil P2 is formed on the optical axis OX, the exit pupil of the eyepiece optical system 130 is located on the optical axis OX. When the second pupil P2 is formed above the optical axis OX, the exit pupil of the eyepiece optical system 130 is formed under the optical axis OX, whereas when the second pupil P2 is formed under the optical axis OX, the exit pupil of the eyepiece optical system 130 is formed above the optical axis OX.

Figure 5:
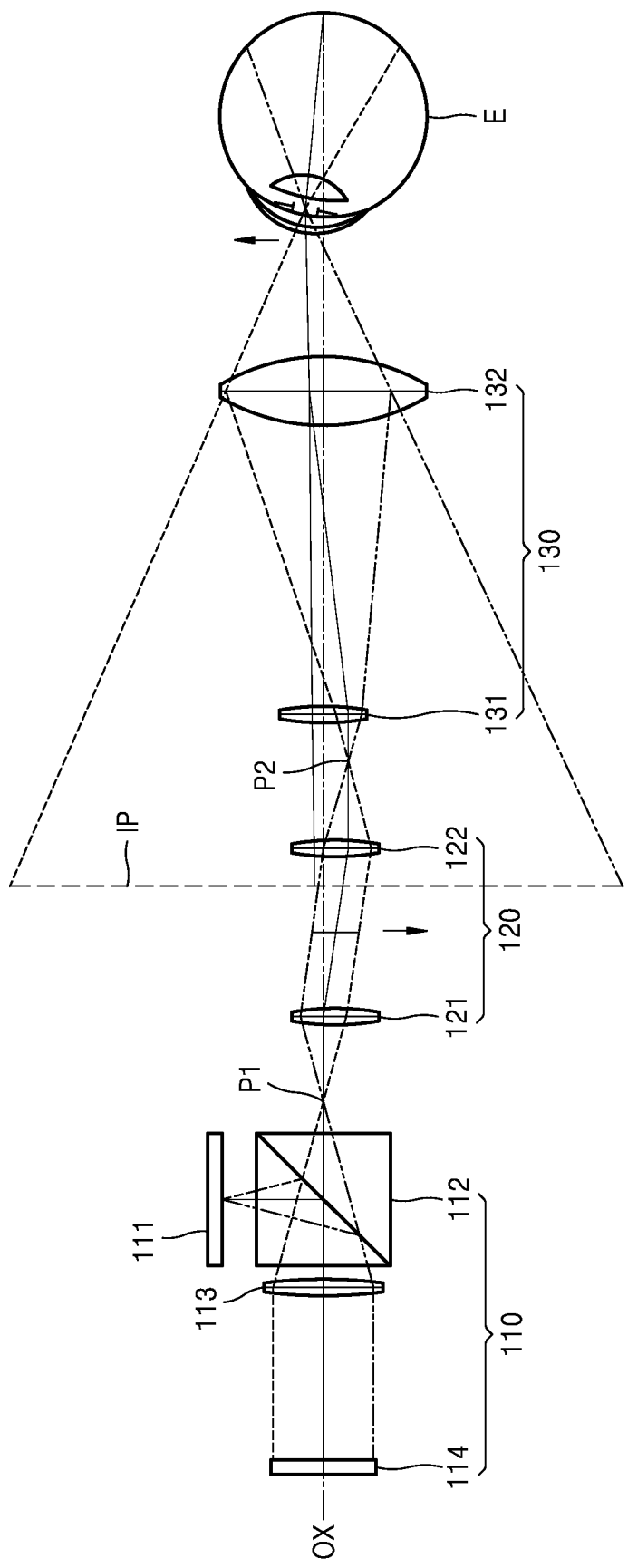
FIG. 5 illustrates movement of an exit pupil of an eyepiece optical system with respect to movement of the image shifting optical system of the display apparatus illustrated in FIG. 1.

FIG. 5 illustrates movement of the exit pupil of the eyepiece optical system 130 with respect to movement of the image shifting optical system 120 in the display apparatus 100 illustrated in FIG. 1. Referring to FIG. 5, when the image shifting optical system 120 moves down with respect to the optical axis OX, the second pupil P2 also moves down with respect to the optical axis OX. Then, the exit pupil of the eyepiece optical system 130 moves up with respect to the optical axis OX. Thus, when the eye tracker 150 determines that the pupil of the eye E of the observer is situated on the optical axis OX, the controller 140 locates the image shifting optical system 120 on the optical axis OX. When the pupil of the eye E of the observer moves up with respect to the optical axis OX, the controller 140 may move the image shifting optical system 120 down with respect to the optical axis OX for a position of the exit pupil of the eyepiece optical system 130 to coincide with a position of the pupil of the eye E of the observer. When the pupil of the eye E of the observer moves down with respect to the optical axis OX, the controller 140 may move the image shifting optical system 120 up with respect to the optical axis OX for the position of the exit pupil of the eyepiece optical system 130 to coincide with the position of the pupil of the eye E of the observer.

Figure 6:
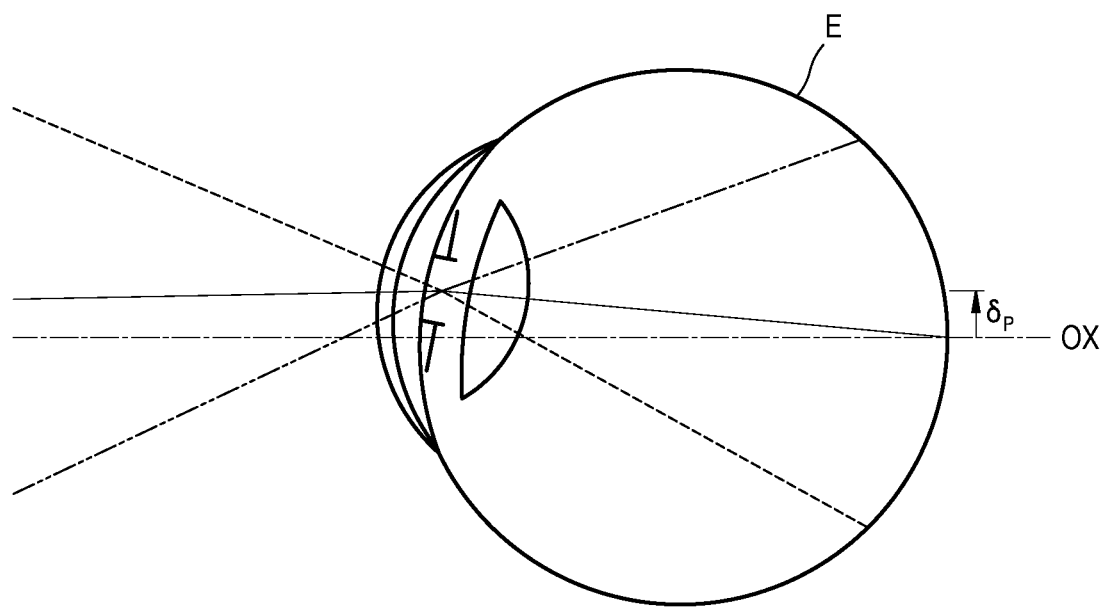
FIG. 6 is an enlarged view of shifting of an image with respect to change of a position of a pupil of an eye of an observer.

FIG. 6 is an enlarged view of shifting of an image with respect to change of a position of the pupil of the eye E of the observer according to an example embodiment. Referring to FIG. 6, when the pupil of the eye E of the observer moves up by a distance $\delta_P$ with respect to the optical axis OX, the controller 140 may move the exit pupil of the eyepiece optical system 130 up by a the distance $\delta_P$ with respect to the optical axis OX to more accurately provide an image to the observer. A relationship between a movement distance $\delta_P$ of the exit pupil of the eyepiece optical system 130 and a movement distance δ of the second pupil P2 by the image shifting optical system 120 may be expressed as in Equation 3.

$$\delta_P = M_P \times \delta \qquad \text{[Equation 3]}$$

In Equation 3, $M_P$ indicates a magnification of the eyepiece optical system 130.

As described above, by moving the image shifting optical system 120 in the direction perpendicular to the optical axis OX, the image may be moved in the direction perpendicular to the optical axis OX. Thus, a change of the position of the pupil of the observer may be more readily responded. According to the above-described example embodiments, the image shifting optical system 120 may use the two optical members 121 and 122, which may contribute to miniaturization of the display apparatus 100. Moreover, based on the image being shifted in the direction perpendicular to the optical axis OX without being shifted in a direction parallel with the optical axis OX, a more accurate image may be provided to the pupil of the observer. In addition, even when the image is shifted, the image is not inclined. Thus, a more accurate image that is not distorted may be provided to the observer.

In the example embodiment illustrated in FIG. 1, the image shifting optical system 120 is interposed on an optical path between the image forming optical system 110 and the eyepiece optical system 130, increasing the length of the entire optical system of the display apparatus 100 by 2×($f_A$+$f_B$). Thus, to shorten the length the entire optical system of the display apparatus 100, the first focal length $f_A$ of the first optical member 121 and the second focal length $f_B$ of the second optical member 122 of the image shifting optical system 120 may be shortened.

Meanwhile, an effective focal length of the entire optical system of the display apparatus 100 may be determined by a size h and a viewing angle θ of the spatial optical modulator 114 as in Equation 4.

Effective focal length of system=$h$/tan θ  [Equation 4]

An effective focal length of the objective lens 113 of the image forming optical system 110 may be defined by Equation 5.

$$\frac{h}{\tan\theta} \times \frac{M_A}{M_P}$$  [Equation 5]

According to Equation 1, as the magnification $M_A$ of the image shifting optical system 120 is small, the second pupil P2 may move more even when the image shifting optical system 120 moves less. However, according to Equation 5, as the magnification $M_A$ of the image shifting optical system 120 is small, the effective focal length of the objective lens 113 may decrease and a diameter of the objective lens 113 may increase. In this regard, the magnification $M_A$ of the image shifting optical system 120 may be set, for example, to be −1 ($M_A$=−1). In other words, the first focal length $f_A$ of the first optical member 121 and the second focal length $f_B$ of the second optical member 122 may be equal to each other. However, example embodiments are not limited thereto. For example, the first focal length $f_A$ of the first optical member 121 and the second focal length $f_B$ of the second optical member 122 may be set differently, based on the size and performance of the entire optical system of the display apparatus 100.

Figure 7:
FIGS. 7, 8, and 9 illustrate various electronic devices to which the display apparatus illustrated in FIG. 1 is applicable.
Figure 8:
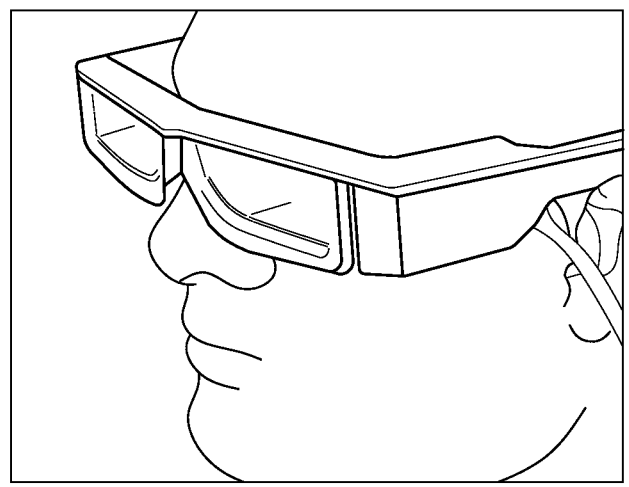
Figure 9:
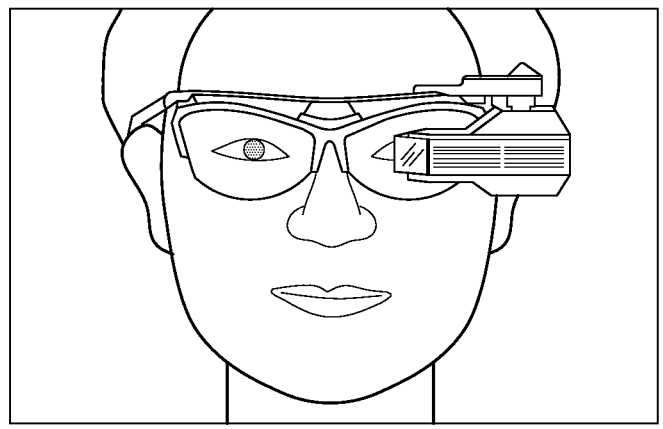

FIGS. 7, 8, and 9 illustrate various example electronic devices to which the above-described display apparatus 100 is applicable. As illustrated in FIGS. 7, 8, and 9, the display apparatus 100 may be included in a wearable device. In other words, the display apparatus 100 may be applied to the wearable device. For example, the display apparatus 100 may be applied to a head mounted display (HMD). The display apparatus 100 may be applied to a glasses-type display, a goggle-type display, etc. Wearable electronic devices illustrated in FIGS. 7, 8, and 9 may operate in association with a smart phone. The display apparatus 100 may be a head-mounted type, glasses-type, or goggle-type VR display apparatus, AR display apparatus, or MR display apparatus capable of providing VR or a virtual image together with an external real image.

The display apparatus 100 may be included in a smart phone that may be used as a multi-image display apparatus. For example, the display apparatus 100 may be applied in a small-size electronic device, such as a mobile electronic device, as well as the wearable device illustrated in FIGS. 7, 8, and 9. An application field of the display apparatus 100 may be changed variously. For example, the display apparatus 100 may be applied to implement VR, AR, or MR, and to other fields. For example, the display apparatus 100 may be applied to a small-size television (TV), a small-size monitor, etc., the user may wear.

Figure 10:
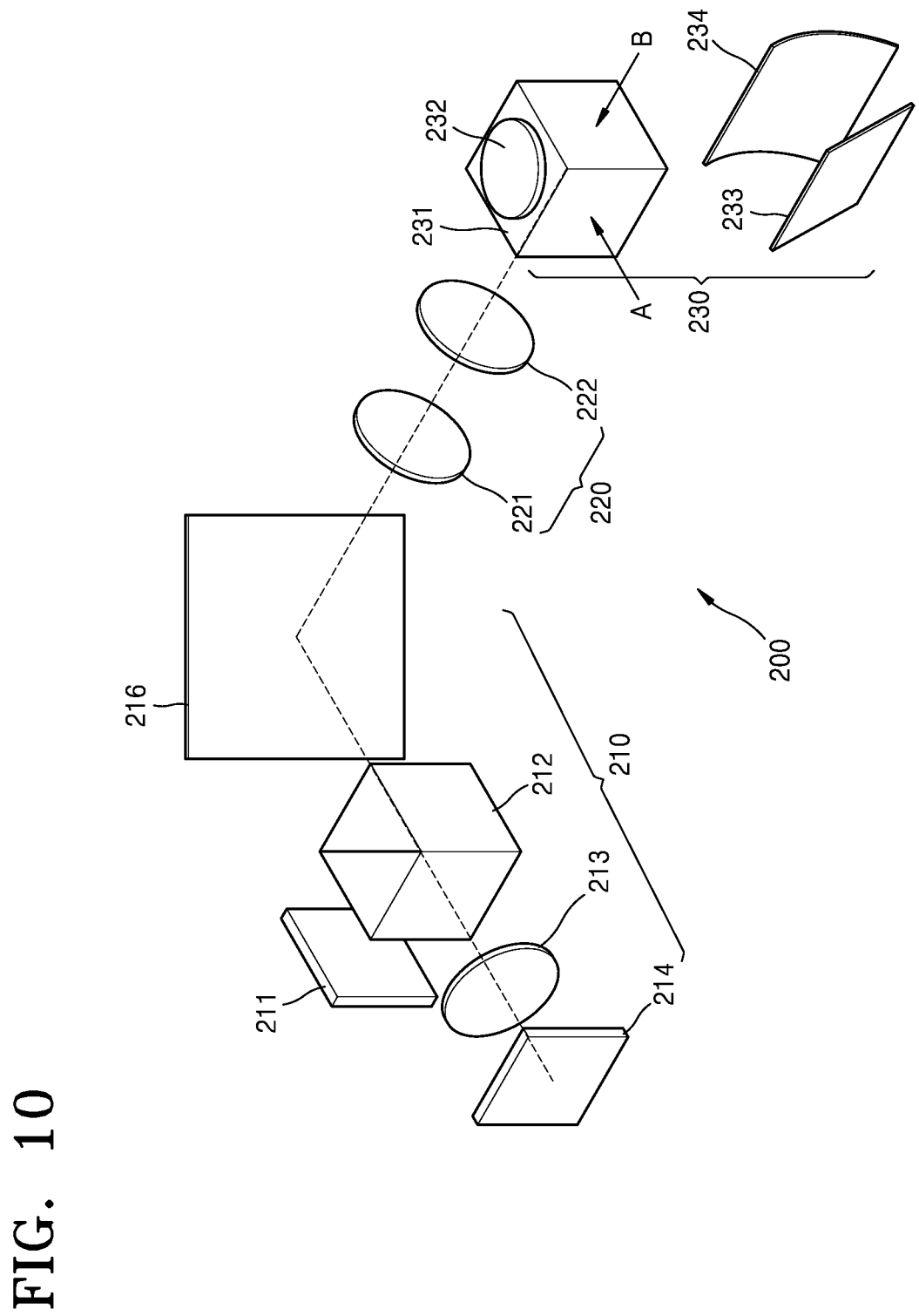
FIG. 10 is a perspective view schematically illustrating a structure of a display apparatus according to an example embodiment.

When the display apparatus 100 is applied to the wearable device illustrated in FIGS. 7, 8, and 9, the optical path may be appropriately selected to effectively use a small space of the wearable device, thus changing some components of the optical system. For example, FIG. 10 is a perspective view schematically illustrating a structure of a display apparatus according to an example embodiment. Referring to FIG. 10, a display apparatus 200 may include an image forming optical system 210, an image shifting optical system 220, and an eyepiece optical system 230. The example embodiment in FIG. 10 may further include the controller 140 and the eye tracker 150 illustrated in FIG. 1.

Among components of the image forming optical system 210 illustrated in FIG. 10, an illuminating device 211, a first beam splitter 212, an objective lens 213, and a spatial optical modulator 214 may be the same as those described with reference to FIG. 1. The image forming optical system 210 may further include a folding mirror 216 that reflects an image focused by the objective lens 213 to bend a travel path of the image. The folding mirror 216 may bend an optical path, for example, by about 90 degrees. However, example embodiments are not limited thereto, and a bending angle of the optical path may change with a shape of an inner space of the wearable device illustrated in FIGS. 7, 8, and 9. For example, the image forming optical system 210 may be positioned at a tip portion of an ear grip of the wearable device, and the image reflected by the folding mirror 216 may move toward a glasses screen along a temple of the wearable device.

The image shifting optical system 220 may include a first optical member 221 and a second optical member 222. Structures and operations of the first optical member 221 and the second optical member 222 of the image shifting optical system 220 may be the same as those described above. The first optical member 221 and the second optical member 222 may be disposed, for example, inside the temple of the wearable device.

The eyepiece optical system 230 may include a second beam splitter 231, a first mirror 232, a third beam splitter 233, and a second mirror 234, which are disposed sequentially along the optical path. The second beam splitter 231 may be disposed on the same layer as the image forming optical system 210 and the image shifting optical system 220. For example, the second beam splitter 231 may be disposed in a position adjacent to the glasses screen inside the temple of the wearable device. The first mirror 232 may be disposed on the second beam splitter 231. The third beam splitter 233 and the second mirror 234 may be disposed under the beam splitter 231. For example, the third beam splitter 233 and the second mirror 234 may be disposed in the glasses screen of the wearable device. The first mirror 232 may be a simple plane mirror. Instead, the first mirror 232 may be a concave mirror that is configured to operate optically equivalent to a convex lens. The second mirror 234 may be a concave mirror for focusing an image on the exit pupil.

Figure 11:
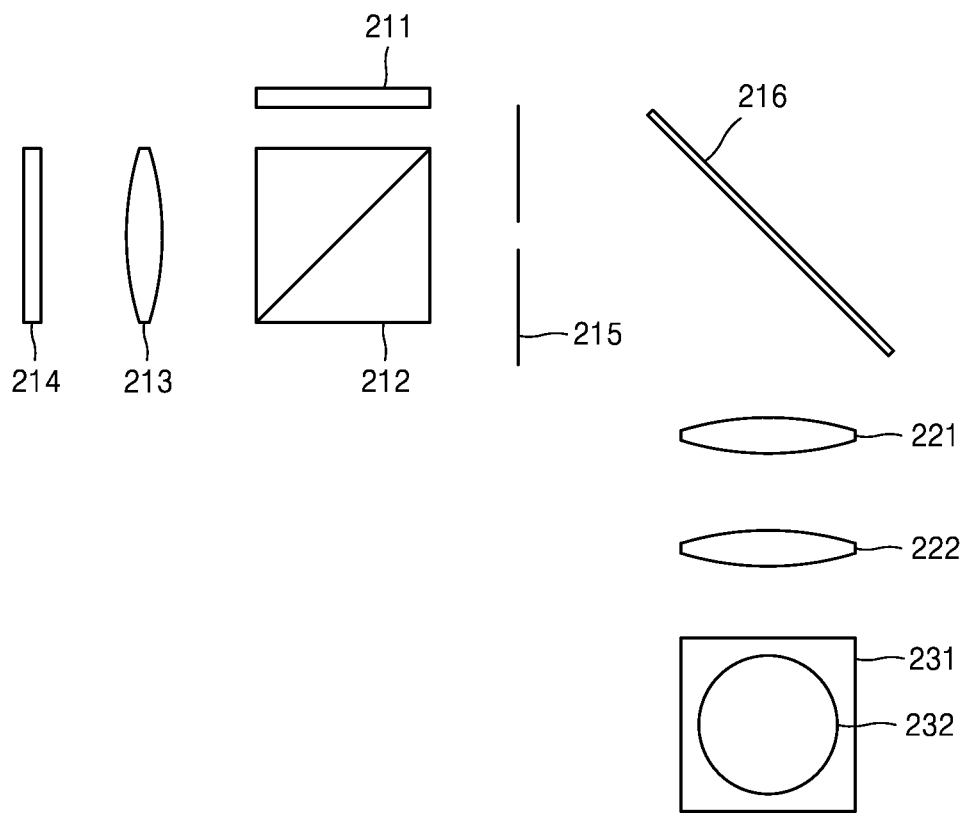
FIG. 11 is a plan view illustrating arrangement of components disposed on the same layer among components of the display apparatus illustrated in FIG. 10.

FIG. 11 is a plan view illustrating arrangement of components disposed on the same layer among components of the display apparatus 200 illustrated in FIG. 10. Referring to FIG. 11, the illuminating device 211, the first beam splitter 212, the objective lens 213, the spatial optical modulator 214, the folding mirror 216, the first optical member 221, the second optical member 222, and the second beam splitter 231 may be disposed on the same layer. Thus, after the image formed in the image forming optical system 210 is reflected by the folding mirror 216, the image may travel in a horizontal direction as a whole until the image is incident on the second beam splitter 231 by passing through the first optical member 221 and the second optical member 222.

The image forming optical system 210 may further include a spatial filter 215 that removes light other than the image focused by the objective lens 213. While the spatial filter 215 is illustrated in FIG. 11 as being disposed between the first beam splitter 212 and the folding mirror 216, the spatial filter 215 may be disposed anywhere on the optical path between the first beam splitter 212 and the second beam splitter 231.

Figure 12:
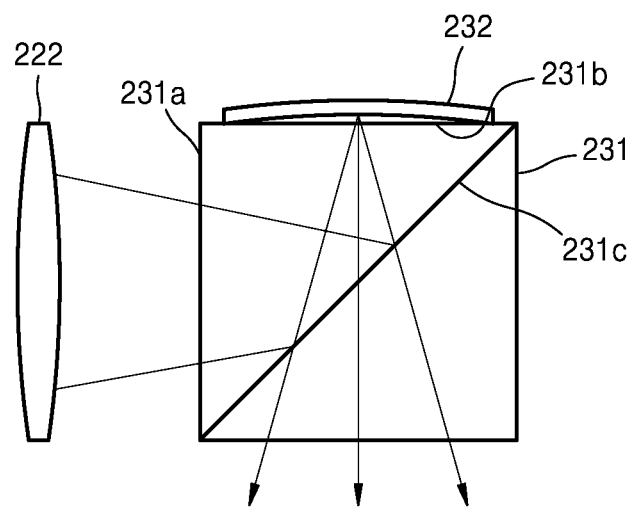
FIG. 12 is a vertical cross-sectional view illustrating a travel path of light incident on an eyepiece optical system.

In the eyepiece optical system 230, the image may travel along a complex path. For example, FIG. 12 is a vertical cross-sectional view illustrating a travel path of light incident on the eyepiece optical system 230 in FIGS. 10 and 11. In particular, FIG. 12 illustrates the eyepiece optical system 230 viewed from a direction A illustrated in FIG. 10. Referring to FIG. 12, the second beam splitter 231 may include a first surface 231a disposed to face the image shifting optical system 220, a second surface 231b adjacent to the first surface 231a, and an inclined surface 231c disposed at an angle with respect to the first surface 231a and the second surface 231b. After the image passing through the second optical member 222 is incident on the first surface 231a of the second beam splitter 231, the image is reflected by the inclined surface 231c and then is incident on the second surface 231b.

The first mirror 232 may be disposed on the second surface 231b of the second beam splitter 231. The first mirror 232 reflects the image toward the inclined surface 231c. The image incident on the second surface 231b is reflected by the first mirror 232 and then passes through the inclined surface 231c. The inclined surface 231c may be a half mirror. For example, the inclined surface 231c may reflect 50% of incident light and transmit the remaining 50% of the incident light, but example embodiments are not limited thereto. For example, the inclined surface 231c may reflect light coming in a direction from the first surface 231a and transmit light coming in a direction from the second surface 231b.

Figure 13:
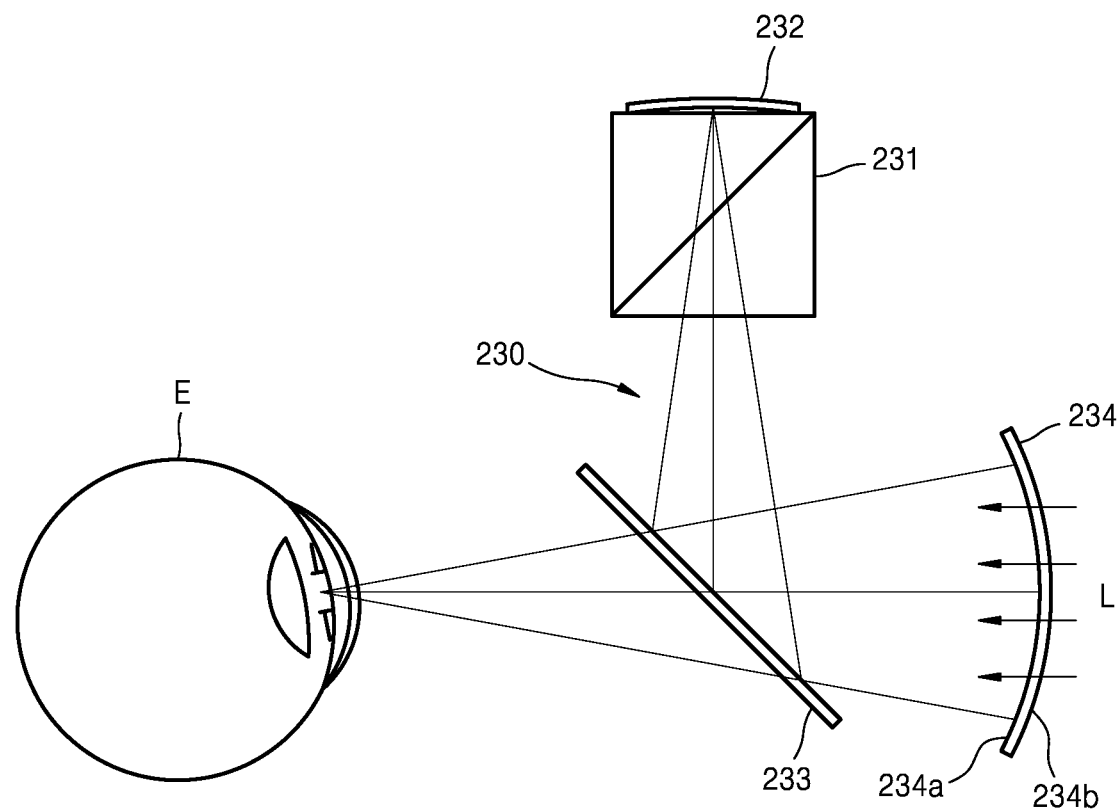
FIG. 13 is a vertical cross-sectional view illustrating a structure of an eyepiece optical system according to an example embodiment.

FIG. 13 is a vertical cross-sectional view illustrating a structure of the eyepiece optical system 230 according to an example embodiment. In particular, FIG. 13 illustrates the eyepiece optical system 230 viewed from a direction B perpendicular to the direction A in FIG. 10. Referring to FIG. 13, an image reflected by the first mirror 232 may be incident on the third beam splitter 233. The third beam splitter 233 may reflect the image to the second mirror 234. The second mirror 234 may be a concave mirror configured to focus the image to the pupil of the observer. When the first mirror 232 is the concave mirror, the first mirror 232 and the second mirror 234 may focus the image to the pupil of the observer together. After the image is reflected by the second mirror 234, the image may be focused to the pupil of the observer by passing through the third beam splitter 233. The third beam splitter 233 may be a half mirror. For example, the third beam splitter 233 may reflect 50% of incident light and transmit the remaining 50% of the incident light, but example embodiments are not limited thereto. For example, the third beam splitter 233 may be configured to reflect light coming in a direction from the first mirror 232 and to transmit light coming in a direction from the second mirror 234.

Figure 14:
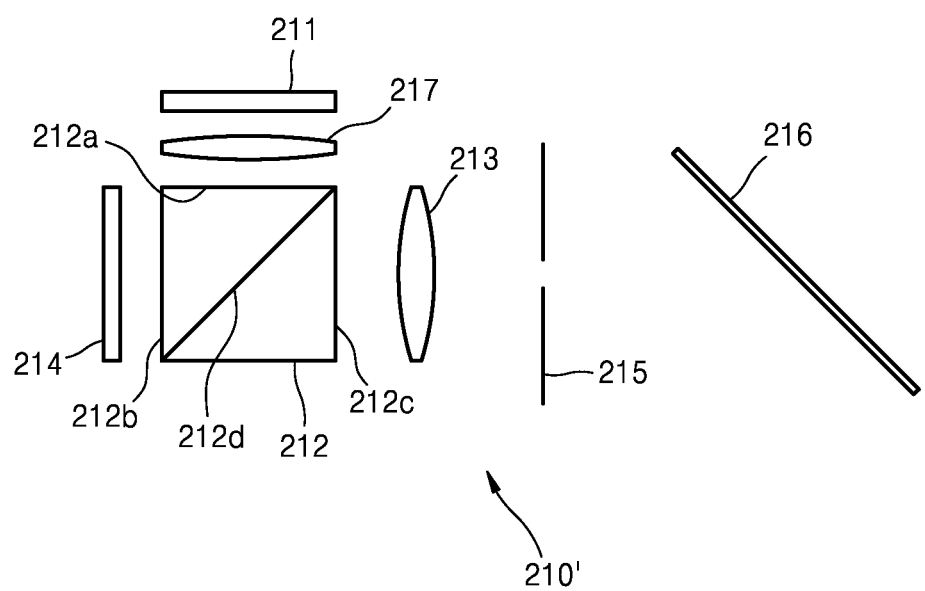
FIG. 14 is a plan view illustrating a structure of an image forming optical system according to an example embodiment.

As illustrated in FIG. 14, the second mirror 234 may be configured to transmit light L coming from outside. For example, the second mirror 234 may include a concave first surface 234a and a convex second surface 234b that is disposed opposite the first surface 234a. The first surface 234a may be configured to reflect incident light, and the second surface 234b may be configured to transmit the incident light. The first surface 234a may focus the image coming from the first mirror 232 while reflecting the image, and the second surface 234b may transmit the light L coming from outside without refraction. The observer may then see a virtual image formed by the spatial optical modulator 214, together with view of the outside.

While FIGS. 10 and 11 illustrate that the objective lens 213 is disposed between the spatial optical modulator 214 and the first beam splitter 212, a configuration of the image forming optical system 210 may be changed variously. For example, FIG. 14 is a plan view illustrating a structure of an image forming optical system according to an example embodiment. Referring to FIG. 14, an image forming optical system 210' according to an example embodiment may include the illuminating device 211, a collimating lens 217 that collimates illumination light emitted from the illuminating device 211 into parallel light, the first beam splitter 212, the objective lens 213, the spatial optical modulator 214, the spatial filter 215, and the folding mirror 216.

The collimating lens 217 may be disposed to face a first surface 212a of the first beam splitter 212. After the illumination light is incident on the first surface 212a of the first beam splitter 212, the illumination light may be reflected by an inclined surface 212d of the first beam splitter 212 and may be incident on a second surface 212b of the first beam splitter 212. On the second surface 212b of the first beam splitter 212, the spatial optical modulator 214 may be disposed. Although the spatial optical modulator 214 is illustrated in FIG. 14 as being spaced apart from the second surface 212b, the spatial optical modulator 214 may be disposed in contact with the second surface 212b without a gap therebetween. The image reflected by the spatial optical modulator 214 may pass through the inclined surface 212d, and then pass through a third surface 212c of the first beam splitter 212. The objective lens 213 may be disposed to face the third surface 212c that is opposite the second surface 212b of the first beam splitter 212. Thus, the image passing through the third surface 212c of the first beam splitter 212 may be focused by the objective lens 213.

Figure 15:
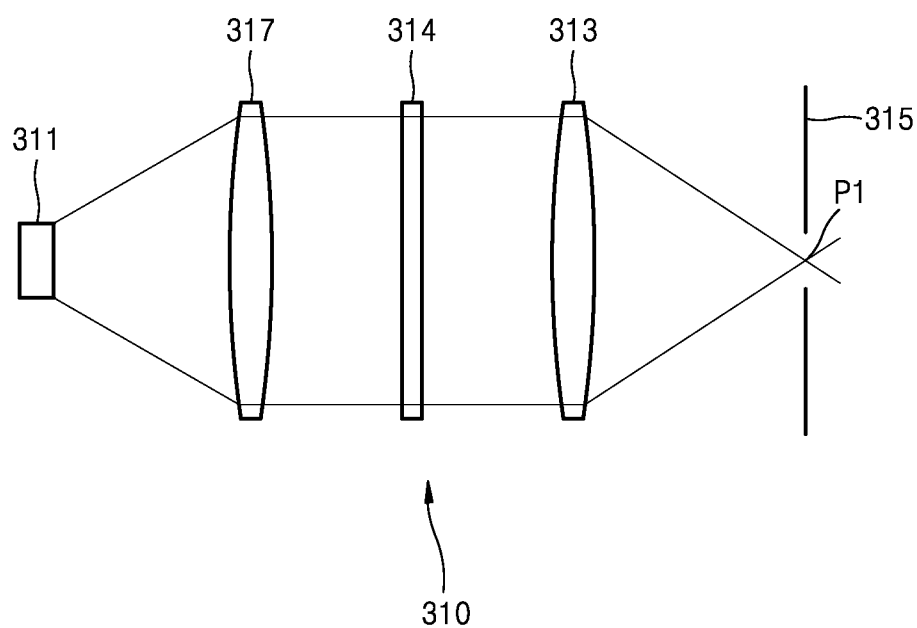
FIG. 15 is a plan view illustrating a structure of an image forming optical system according to an example embodiment.

While the spatial optical modulators 114 and 214 have been described as a reflective type, the spatial optical modulator may also be of a transmissive type. For example, FIG. 15 is a plan view illustrating a structure of an image forming optical system according to an example embodiment. Referring to FIG. 15, an image forming optical system 310 according to an example embodiment may include an illuminating device 311 that provides illumination light, a collimating lens 317 that collimates the illumination light emitted from the illuminating device 311 into parallel light, a spatial optical modulator 314 that forms an image by transmitting and modulating the illumination light, an objective lens 313 that focuses the image formed by the spatial optical modulator 314 to the first pupil P1, and a spatial filter 315 that removes light other than the image focused by the objective lens 313. The spatial optical modulator 314 of the transmissive type may use, for example, a semiconductor modulator based on a compound semiconductor such as gallium arsenide (GaAs), or a liquid crystal device (LCD).

Figure 16:
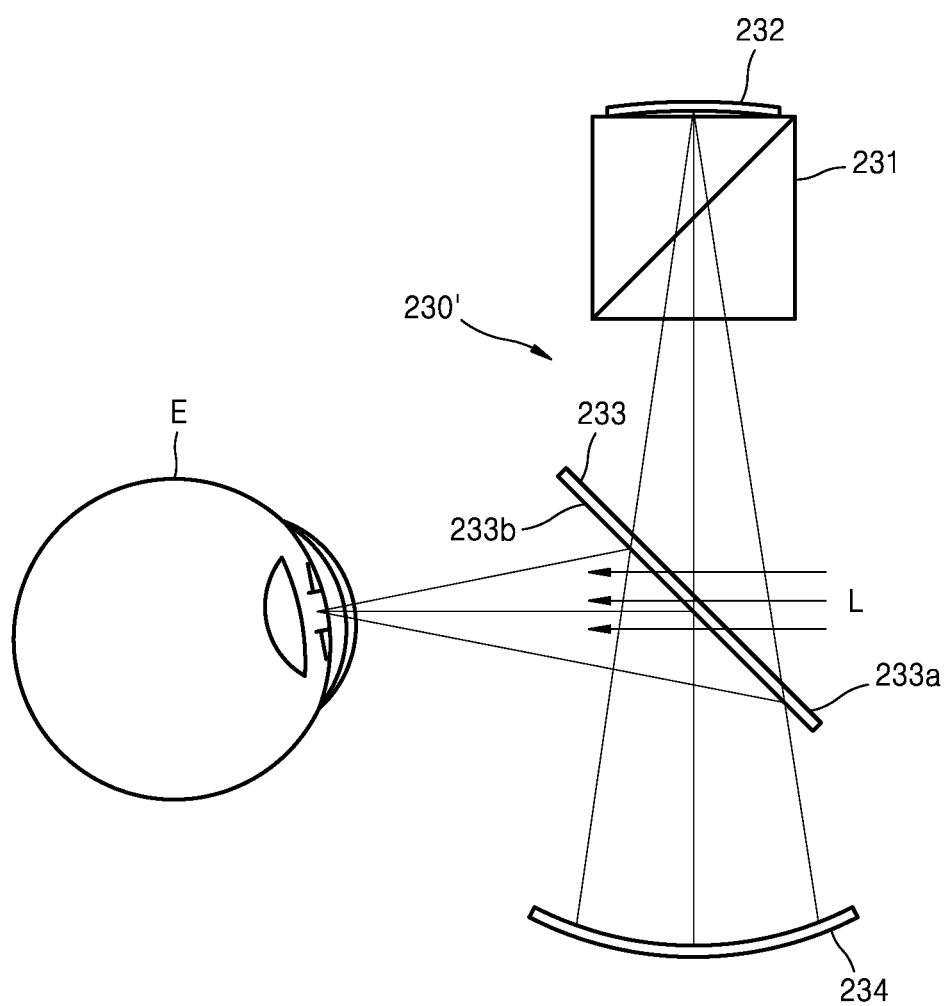
FIG. 16 is a cross-sectional view illustrating a structure of an eyepiece optical system according to an example embodiment.

FIG. 16 is a cross-sectional view illustrating a structure of an eyepiece optical system according to an example embodiment. Referring to FIG. 16, an eyepiece optical system 230' according to an example embodiment may include the second beam splitter 231, the first mirror 232, the third beam splitter 233, and the second mirror 234, which are disposed sequentially along the optical path. In the eyepiece optical system 230' illustrated in FIG. 16, the second mirror 234 may be disposed to face the first mirror 232 with the third beam splitter 233 therebetween. The third beam splitter 233 may include a first surface 233a facing the first surface 232 and a second surface 233b facing the second mirror 234, in which the first surface 233a and the second surface 233b are disposed on opposite sides.

The third beam splitter 233 may be configured to transmit light incident on the first surface 233a and to reflect light incident on the second surface 233b. An image reflected by the first mirror 232 may then arrive at the second mirror 234 by passing through the first surface 233a of the third beam splitter 233. An image reflected by the second mirror 234 may be focused on the pupil of the observer by being reflected by the second surface 233b of the third beam splitter 233. The third beam splitter 233 may be disposed such that the first surface 233a faces the outside. The third beam splitter 233 may then transmit the light L coming from outside without refraction. Thus, the observer may then see a virtual image formed by the spatial optical modulator 214, together with view of the outside.

So far, it has been described that the first optical member 121 and the second optical member 122 of the image shifting optical system 120 and the first optical member 221 and the second optical member 222 of the image shifting optical system 220 include convex lenses. However, a concave mirror that is configured to operate optically equivalent to a convex lens may also be used in place of the convex lens. For example, FIGS. 17, 18, 19, and 20 illustrate a structure of an image shifting optical system according to various example embodiments.

Figure 17:
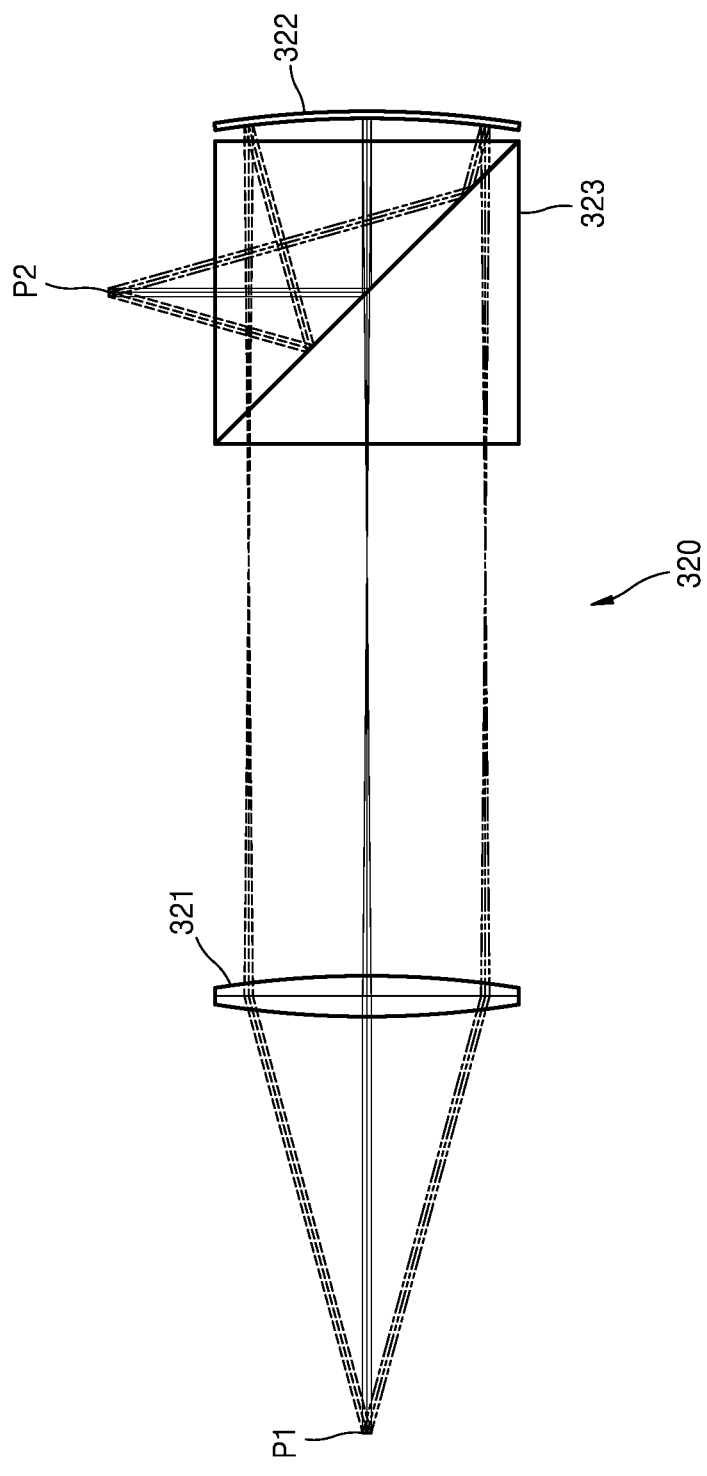
FIGS. 17, 18, 19, and 20 illustrate a structure of an image shifting optical system according to example embodiments.

Referring to FIG. 17, an image shifting optical system 320 may include a first optical member 321 including a convex lens, a second optical member 322 including a concave lens, and a beam splitter 323 that may transmit light coming from the first optical member 321 and reflect light coming from the second optical member 322. The second optical member 322 may be disposed to face the first optical member 321 with the beam splitter 323 therebetween. That is, the first optical member 321 and the second optical member 322 may be disposed to face opposite surfaces of the beam splitter 323, respectively. In this structure, the image may pass through the beam splitter 323 via the first optical member 321. The image may be reflected by the second optical member 322, and may be focused on the second pupil P2 by being reflected by the beam splitter 323.

Figure 18:
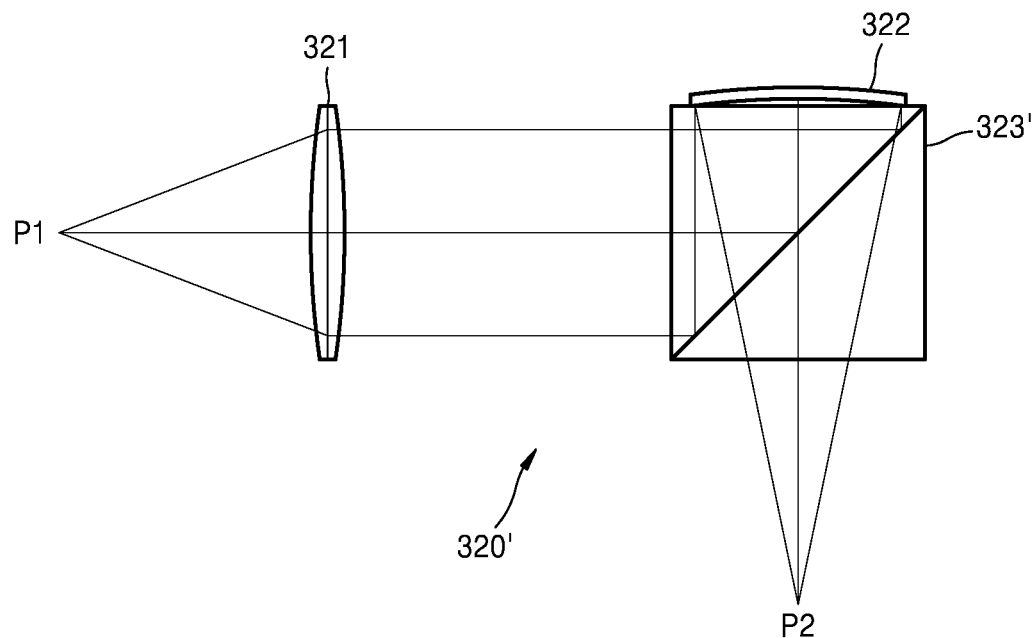

Referring to FIG. 18, an image shifting optical system 320' may include the first optical member 321 including a convex lens, the second optical member 322 including a concave lens, and a beam splitter 323' that may reflect light coming from the first optical member 321 and transmit light coming from the second optical member 322. In this case, the first optical member 321 and the second optical member 322 may be disposed to face two adjacent surfaces of the beam splitter 323'. In this structure, the image may be reflected by the beam splitter 323' via the first optical member 321. The image may be reflected by the second optical member 322, and may be focused on the second pupil P2 by passing through the beam splitter 323'.

Figure 19:
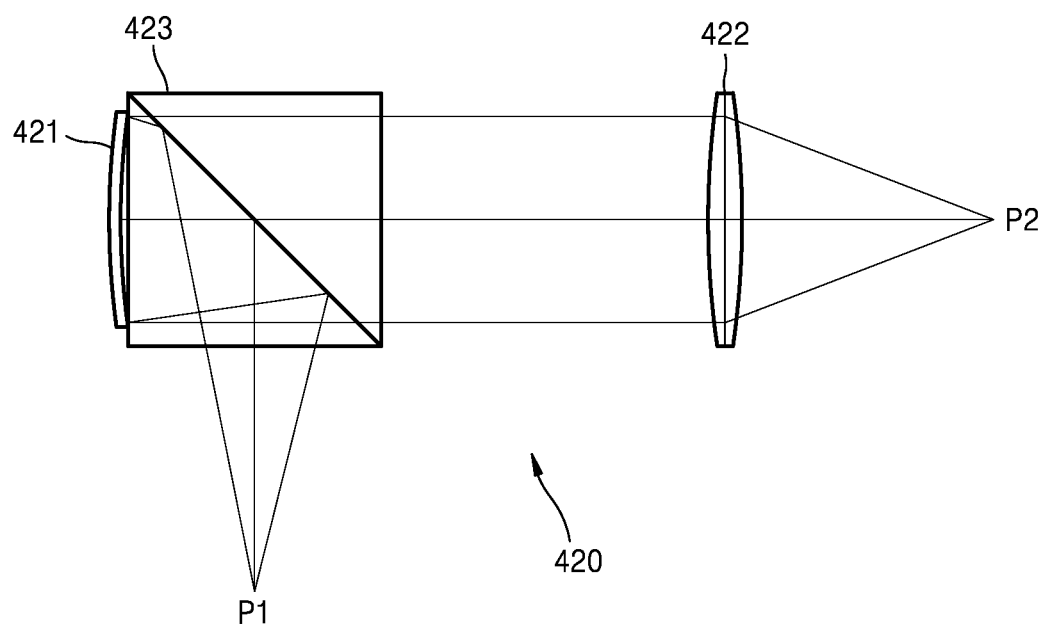

Referring to FIG. 19, an image shifting optical system 420 may include a first optical member 421 including a concave mirror, a second optical member 422 including a convex mirror, and a beam splitter 423 that may reflect light coming from an image forming optical system and transmit light coming from the first optical member 421 toward the second optical member 422. The second optical member 422 may be disposed to face the first optical member 421 with the beam splitter 423 therebetween. That is, the first optical member 421 and the second optical member 422 may be disposed to face opposite surfaces of the beam splitter 423, respectively. In this structure, the image focused on the first pupil P1 by the image forming optical system may be reflected by the beam splitter 423 and then reflected by the first optical member 421. The image may then be focused on the second pupil P2 by the second optical member 422 by passing through the beam splitter 423.

The beam splitter 423 may be configured to transmit light coming from the image forming optical system and reflect light coming from the first optical member 421 toward the second optical member 422. In this case, the first optical member 421 and the second optical member 422 may be disposed to face two adjacent surfaces of the beam splitter 423.

In the example embodiments illustrated in FIGS. 17, 18, and 19, a travel path of the image between the first pupil P1 and the second pupil P2 is bent by about 90 degrees. Thus, when the image shifting optical systems 320, 320', and 420 illustrated in FIGS. 17, 18, and 19 are used, the image forming optical system 210 may not include the folding mirror 216.

Figure 20:
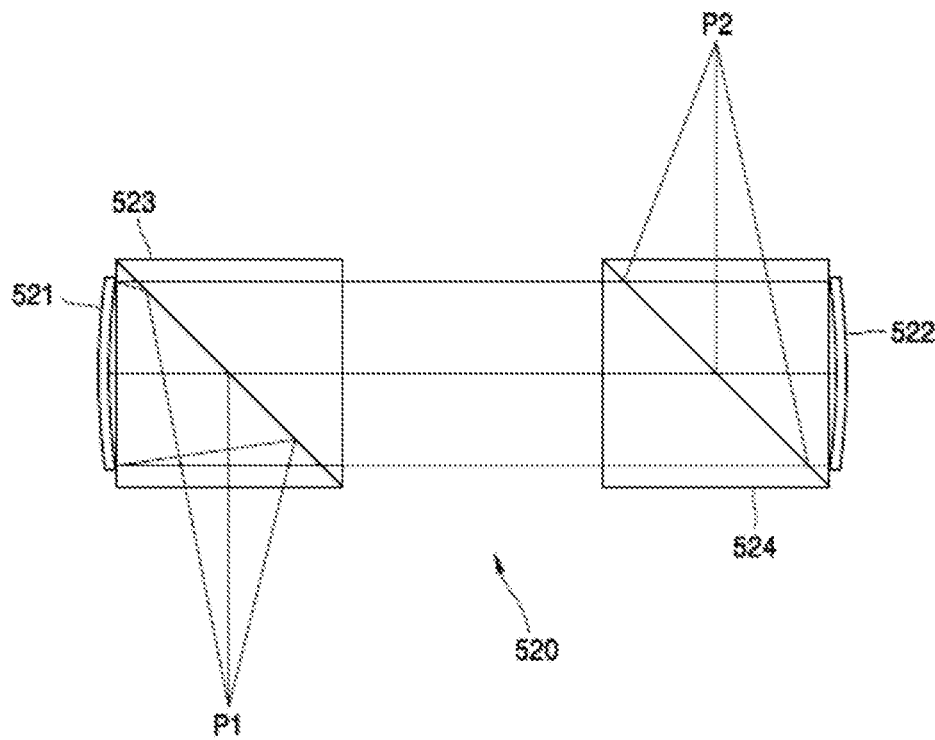

Referring to FIG. 20, both a first optical member 521 and a second optical member 522 of an image shifting optical system 520 may be concave mirrors. The image shifting optical system 520 may include a first optical member 521 including a concave mirror, a second optical member 522 including a concave mirror, a first beam splitter 523 that may reflect light coming from the image forming optical system and transmit light coming from the first optical member 521 toward the second optical member 522, and a second beam splitter 524 that may transmit light coming from the first optical member 521 and reflect light coming from the second optical member 522. In this structure, the image focused on the first pupil P1 by the image forming optical system may be incident on the first optical member 521 by being reflected by the first beam splitter 523. The image may be reflected by the first optical member 521 and then may be incident on the second optical member 522 by passing through the first beam splitter 523 and the second beam splitter 524. The image may be reflected by the second optical member 522, and may be focused on the second pupil P2 by being reflected by the second beam splitter 524.

It should be understood that embodiments described herein should be considered in a descriptive sense only and not for purposes of limitation. Descriptions of features or aspects within each example embodiment should typically be considered as available for other similar features or aspects in other embodiments.

While example embodiments have been described with reference to the figures, it will be understood by those of ordinary skill in the art that various changes in form and details may be made therein without departing from the spirit and scope as defined by the following claims.

What is claimed is:

1. An augmented reality (AR) apparatus comprising:
an image forming optical system configured to form an image to be displayed;
an eyepiece optical system configured to provide the image formed by the image forming optical system to a pupil of an observer;
an image shifting optical system disposed on an optical path between the image forming optical system and the eyepiece optical system, the image shifting optical system being configured to move in a direction perpendicular to an optical axis to shift the image formed by the image forming optical system in the direction perpendicular to the optical axis,
an eye tracker comprising at least one processor configured to track a position of the pupil of the observer;
a controller comprising at least one processor configured to control a position of the image shifting optical system based on a change of the position of the pupil of the observer provided from the eye tracker; and
an actuator configured to move the image shifting optical system in the direction perpendicular to the optical axis based on a control of the controller,
wherein, when the image shifting optical system moves by a first distance in the direction perpendicular to the optical axis, the image is shifted by a second distance in the direction perpendicular to the optical axis,
wherein, when $\delta$ denotes the second distance, $\Delta$ denotes the first distance, and $M_A$ denotes the magnification of the image shifting optical system, $\delta$ satisfies $\delta=-\Delta(1/M_A-1)$.

2. The AR apparatus of claim 1, wherein the image shifting optical system comprises a first optical member having a first focal length and a second optical member having a second focal length;
wherein a distance between the first optical member and the second optical member along the optical axis is equal to a sum of the first focal length and the second focal length, and
wherein the actuator is configured to simultaneously move the first optical member and the second optical member by a same distance in a same direction.

3. The AR apparatus of claim 2, wherein the first focal length of the first optical member and the second focal length of the second optical member are equal to each other.

4. The AR apparatus of claim 2, wherein the first optical member is spaced apart by the first focal length along the optical axis toward an image side from a first pupil on which the image is focused between the image forming optical system and the first optical member.

5. The AR apparatus of claim 4, wherein the second optical member is spaced apart by the second focal length along the optical axis toward an object side from a second pupil on which the image is focused between the image shifting optical system and the eyepiece optical system.

6. The AR apparatus of claim 2, wherein the first optical member and the second optical member respectively comprise a convex lens.

7. The AR apparatus of claim 2, wherein the first optical member comprises a convex lens, and the second optical member comprises a concave lens.

8. The AR apparatus of claim 7, wherein the image shifting optical system further comprises a beam splitter configured to transmit light incident from the first optical member and to reflect light incident from the second optical member.

9. The AR apparatus of claim 7, wherein the image shifting optical system further comprises a beam splitter configured to reflect light incident from the first optical member and to transmit light incident from the second optical member.

10. The AR apparatus of claim 2, wherein the first optical member comprises a concave lens, and the second optical member comprises a convex lens.

11. The AR apparatus of claim 10, wherein the image shifting optical system further comprises a beam splitter configured to reflect light incident from the image forming optical system and to transmit light incident from the first optical member toward the second optical member.

12. The AR apparatus of claim 1, wherein
a movement distance $\delta_P$ of an exit pupil in the direction perpendicular to the optical axis satisfies $\delta_P=M_P\times\delta$,
$M_P$ being a magnification of the eyepiece optical system.

13. The AR apparatus of claim 1, wherein the image forming optical system comprises:
a light source configured to emit illumination light;
a spatial optical modulator configured to form the image by reflecting and modulating the illumination light; and
a beam splitter configured to transmit the illumination light to the spatial optical modulator and transmit the image formed by the spatial optical modulator to the image shifting optical system.

14. The AR apparatus of claim 13, wherein the image forming optical system further comprises an objective lens configured to collimate the illumination light emitted from the light source to the spatial optical modulator and focus the image formed by the spatial optical modulator on a first pupil between the image forming optical system and the image shifting optical system.

15. The AR apparatus of claim 14, wherein the image forming optical system further comprises a spatial filter configured to remove light other than the image focused by the objective lens.

16. The AR apparatus of claim 14, wherein the image forming optical system further comprises a folding mirror configured to bend a travel path of the image by reflecting the image focused by the objective lens.

17. The AR apparatus of claim 1, wherein the image forming optical system comprises:
a light source configured to emit illumination light;
a collimating lens configured to collimate the illumination light into parallel light;
a spatial optical modulator configured to form the image by transmitting and modulating the illumination light that is collimated; and
an objective lens configured to focus the image formed by the spatial optical modulator on a first pupil that is located between the image forming optical system and a first optical member.

18. The AR apparatus of claim 1, wherein the eyepiece optical system comprises:
a first beam splitter configured to reflect light incident from a first surface of the first beam splitter and to transmit light incident from a second surface of the first beam splitter;
a first mirror disposed on the second surface of the first beam splitter and configured to reflect light;
a second mirror configured to focus the image on the pupil of the observer; and a second beam splitter configured to reflect light incident from the first mirror to the second mirror and to transmit light incident from the second mirror.

19. The AR apparatus of claim 1, wherein the eyepiece optical system comprises:
a first beam splitter configured to reflect light incident from a first surface of the first beam splitter and to transmit light incident from a second surface of the first beam splitter;
a first mirror disposed on the second surface of the first beam splitter and configured to reflect light;
a second mirror configured to focus the image on the pupil of the observer; and
a second beam splitter configured to transmit light coming from the first mirror to the second mirror and to reflect light coming from the second mirror.

* * * * *